(12) United States Patent
Caspers et al.

(10) Patent No.: US 10,440,620 B2
(45) Date of Patent: Oct. 8, 2019

(54) SYSTEMS AND METHODS FOR BIDIRECTIONAL NETWORK GEOGRAPHY DELIVERY

(71) Applicant: ROCKWELL AUTOMATION TECHNOLOGIES, INC., Mayfield Heights, OH (US)

(72) Inventors: John P Caspers, Racine, WI (US); Patrick D Telljohann, Solon, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 176 days.

(21) Appl. No.: 15/217,374

(22) Filed: Jul. 22, 2016

(65) Prior Publication Data
US 2018/0027462 A1    Jan. 25, 2018

(51) Int. Cl.
*H04W 36/08*    (2009.01)
*H04W 36/00*    (2009.01)
*H04L 12/24*    (2006.01)

(52) U.S. Cl.
CPC ......... *H04W 36/08* (2013.01); *H04L 41/0806* (2013.01); *H04L 41/12* (2013.01);
(Continued)

(58) Field of Classification Search
CPC ....................................................... H04M 1/00
(Continued)

(56) References Cited

U.S. PATENT DOCUMENTS

| 4,095,862 A | 6/1978 | Hatch |
| 4,252,396 A | 2/1981 | Wilson |

(Continued)

FOREIGN PATENT DOCUMENTS

| CN | 2648674 Y | 10/2004 |
| EP | 1967929 A2 | 9/2008 |

(Continued)

OTHER PUBLICATIONS

Siemens, Simatic Net, AS-Interface—Introduction and Basics Manual, Release Apr. 2006, 62 pages.
(Continued)

*Primary Examiner* — Iqbal Zaidi
(74) *Attorney, Agent, or Firm* — Quarles & Brady LLP (57) ABSTRACT

Systems, methods and apparatus for bidirectional network geography delivery are disclosed. The methods include receiving a reference subnet network geography from a main network device, storing the received reference subnet network geography, retrieving an actual subnet network geography of a subnet network, comparing the reference subnet network geography to the actual subnet network geography and determining if they are compatible, and commissioning the subnet network based on the received reference subnet network geography when the received reference subnet network geography is compatible with the actual subnet network geography of the subnet network. The methods also include retrieving an actual subnet network geography of a subnet and sending it a main network device, causing it to become a new reference subnet network geography and sending the new reference subnet network geography to a main network device.

20 Claims, 8 Drawing Sheets

(52) U.S. Cl.
CPC ......... *H04L 41/14* (2013.01); *H04W 36/0061* (2013.01); *H04W 36/0083* (2013.01)

(58) Field of Classification Search
USPC ................................................ 370/252–475
See application file for complete search history.

(56) References Cited

U.S. PATENT DOCUMENTS

| | | |
|---|---|---|
| 4,359,257 A | 11/1982 | Lopinski et al. |
| 4,641,904 A | 2/1987 | Kosugi et al. |
| 4,773,876 A | 9/1988 | Nakamura et al. |
| 5,059,137 A | 10/1991 | Dale et al. |
| 5,242,313 A | 9/1993 | Logerot et al. |
| 5,242,314 A | 9/1993 | Di Giulio et al. |
| 6,074,238 A | 6/2000 | DeRoss et al. |
| 6,232,557 B1 | 5/2001 | Lounsbury et al. |
| 6,394,833 B1 | 5/2002 | Bulmer et al. |
| 6,400,103 B1 | 6/2002 | Adamson |
| 6,425,770 B1 | 7/2002 | Lostoski et al. |
| 6,442,144 B1* | 8/2002 | Hansen ............ H04L 29/12018 370/255 |
| 6,732,202 B1 | 5/2004 | Ying |
| 6,935,885 B2 | 8/2005 | Scherer et al. |
| 7,080,150 B1 | 7/2006 | Wehrle et al. |
| 7,112,073 B2 | 9/2006 | Morlok |
| 7,228,363 B1 | 6/2007 | Wehrle et al. |
| 7,313,607 B1 | 12/2007 | Rosenberg |
| 7,412,530 B1 | 8/2008 | Wehrle et al. |
| 7,483,396 B2 | 1/2009 | Steindl |
| 7,721,079 B2 | 5/2010 | Wehrle et al. |
| 8,433,827 B2 | 4/2013 | Biehler |
| 9,813,290 B2 | 11/2017 | Saltsidis |
| 9,876,674 B1 | 1/2018 | Murray et al. |
| 2002/0184573 A1 | 12/2002 | Rousseau et al. |
| 2004/0158713 A1 | 8/2004 | Aneweer et al. |
| 2005/0021738 A1 | 1/2005 | Goeller et al. |
| 2005/0024026 A1 | 2/2005 | Hung et al. |
| 2005/0243739 A1 | 11/2005 | Anderson |
| 2005/0262218 A1 | 11/2005 | Cox et al. |
| 2008/0192650 A1 | 8/2008 | Kolhi |
| 2008/0281947 A1 | 11/2008 | Kumar |
| 2009/0198385 A1 | 8/2009 | Oe et al. |
| 2009/0205022 A1 | 8/2009 | Sanchez et al. |
| 2010/0030345 A1 | 2/2010 | Cole et al. |
| 2010/0186229 A1 | 7/2010 | Enomoto et al. |
| 2010/0205271 A1 | 8/2010 | Callaghan |
| 2010/0205281 A1 | 8/2010 | Porter et al. |
| 2011/0222200 A1 | 9/2011 | Fuller et al. |
| 2012/0066356 A1 | 3/2012 | Nguyen et al. |
| 2012/0253540 A1 | 10/2012 | Coyne |
| 2012/0258726 A1 | 10/2012 | Bansal et al. |
| 2013/0073760 A1 | 3/2013 | Wiesgickl |
| 2013/0275566 A1 | 10/2013 | Huth et al. |
| 2013/0288640 A1 | 10/2013 | Bonner |
| 2014/0258455 A1 | 9/2014 | Julicher |
| 2014/0280881 A1 | 9/2014 | Szamonek et al. |
| 2015/0117244 A1 | 4/2015 | Williamson |
| 2015/0201101 A1 | 7/2015 | Kaminushi |
| 2015/0256389 A1* | 9/2015 | Ruess ................ H04L 67/025 709/222 |
| 2015/0350229 A1 | 12/2015 | Mitchel |
| 2016/0006628 A1 | 1/2016 | Herring et al. |
| 2016/0013948 A1 | 1/2016 | Moses |
| 2016/0070282 A1 | 3/2016 | Chapel et al. |
| 2016/0139999 A1 | 5/2016 | Gabler et al. |
| 2016/0269373 A1 | 9/2016 | White et al. |
| 2017/0025892 A1 | 1/2017 | Van Ostrand et al. |
| 2017/0026441 A1 | 1/2017 | Moudy et al. |
| 2017/0134477 A1 | 5/2017 | Ben Dayan et al. |
| 2017/0237556 A9 | 8/2017 | Denning et al. |
| 2017/0272452 A1* | 9/2017 | Kraemer ............ H04L 63/1416 |
| 2017/0303079 A1 | 10/2017 | Ikemoto et al. |

FOREIGN PATENT DOCUMENTS

| | | |
|---|---|---|
| EP | 1983616 A2 | 10/2008 |
| GB | 2442304 B | 10/2008 |
| KR | 1020110017576 A | 2/2011 |
| WO | 03023634 A1 | 3/2003 |
| WO | 2006089718 A2 | 8/2006 |
| WO | 2009150527 A1 | 12/2009 |

OTHER PUBLICATIONS

Peter Matray et al; On the Network Geography of the Internet, Infocom, 2011 Proceedings IEEE, IEEE, Apr. 10, 2011, pp. 126-130.

Extended European Search Report; Appln. No. 17178251.9-1862; dated Sep. 27, 2017; 9 pages.

Anderson, et al., Automated Power Distribution System Hardware, In Energy Conversion Engineering Conference, 1989, IECEC-89, Proceedings of the 24th Intersociety, pp. 579-584, IEEE, 1989.

Burgess, How to Assign a Static IP Address in Windows 7, 8, 10, XP, or Vista, Nov. 10, 2013, https://www.howtogeek.com/howto/19249/how-to-assign-a-static-ip-address-in-xp-vista-or-windows-7/, 17 pages.

Moyne, et al., The Emergence of Industrial Control Networks for Manufacturing Control, Diagnostics, and Safety Data, Proceedings of the IEEE, 2007, 95(1):29-47.

Satchell, How Can I Configure a DHCP Server to Assign Addresses Based on the OS that is Running, https://lists.sc.org/pipermail/dhcp-users/2010-May/011783.html, May 2010, 9 pages.

European Patent Office, Extended European Search Report, EP 17177835.0, dated Jan. 2, 2018, 10 pages.

European Patent Office, Partial European Search Report, EP 17178252.7, dated Jan. 3, 2018, 15 pages.

European Patent Office, Extended European Search Report, EP 17178252.7, dated Mar. 27, 2018; 18 pages.

European Patent Office, Extended European Search Report, EP 17178254.3, dated Oct. 5, 2017, 8 pages.

European Patent Office, Extended European Search Report, EP 17178256.8, dated Nov. 30, 2017, 7 pages.

European Patent Office, Extended European Search Report; EP 17178258A, dated Dec. 20, 2017, 9 pages.

\* cited by examiner

SYSTEMS AND METHODS FOR BIDIRECTIONAL NETWORK GEOGRAPHY DELIVERY

BACKGROUND

The subject matter disclosed within relates generally to a communication network, and particularly relates to systems and methods for bidirectional network geography delivery.

A network system may be used for interconnecting devices for communications. A range of devices may be interconnected in the network system. For example, network devices may include relays, motor starters, pushbuttons and computers. A collection of any number of devices of various device types in conjunction with how they are interconnected on a network is called a network geography.

A network geography can be represented as a collection of device keys. A device key contains device identification information for a single networked device. It may be comprised of device identifying attributes inherent to the device, such as the device vendor, the device type, the device product code, the device hardware revision, device serial number, and the device software revision. When device keys are used to represent a network geography, they must also be comprised of attributes that enumerate information about the relative geographic location of a device on a network, and thus how the network device interconnects with other network devices.

Technical difficulties may exist for specifying the number and types of devices on a network along with how they are interconnected. The specification of a collection of devices in conjunction with the specification of how they are to be interconnected is called a reference network geography.

Technical difficulties may also exist for discovering or retrieving the number and types of devices on a network along with how they are interconnected. A retrieved collection of devices in conjunction with the retrieved data pertaining to how they are interconnected is called an actual network geography.

Technical challenges may further exist for defining and storing reference network geographies, discovering actual network geographies, and comparing actual network geographies to reference network geographies for the purposes of validating that an actual network geography is compatible with a reference network geography.

Technical challenges may exist for retrieving an actual network geography, presenting it, and upon receiving a directive from a system commissioner, committing it to becoming a new reference network geography for a network system.

BRIEF SUMMARY OF THE INVENTION

The above problems can be solved by providing methods, a network apparatus and systems for bidirectional network geography delivery.

In one aspect, the present invention provides a method of bidirectional network geography delivery. The method may include receiving, by a network gateway, a reference subnet network geography from a device on a main network where the reference subnet network geography may include a complete set of reference device keys for all devices in the subnet network, and each reference device key comprises one or more device identifying attributes of a reference device in the subnet network and a reference device key component to enumerate a reference relative geographic location on the network, storing the received reference subnet network geography, retrieving an actual subnet network geography of a subnet network, where the actual subnet network geography may include a complete set of actual device keys for all devices in the subnet network, and each actual device key comprises one or more device identifying attributes of an actual device in the subnet network and an actual device key component to enumerate an actual relative geographic location on the network, comparing the reference subnet network geography to the actual subnet network geography and determining if they are compatible, and commissioning the subnet network based on the received reference subnet network geography when the received reference subnet network geography is compatible with the actual subnet network geography of the subnet network.

The method may further include causing the actual subnet network geography to become a new reference subnet network geography.

In yet another aspect, the present invention provides a network apparatus that may include a processor and non-transitory computer readable medium storing processing instructions for bidirectional network geography delivery, where the processing instructions, when executed by the processor, may cause the processor to: receive, by the network apparatus, a reference subnet network geography from a device on a main network where the reference subnet network geography may include a complete set of reference device keys for all devices for the subnet network, and each reference device key may include one or more device identifying attributes for a reference device in the subnet network and a reference device key component to enumerate a reference relative geographic location on the network, store the reference subnet geography, retrieve an actual subnet network geography of a subnet network, where the actual subnet network geography may include a complete set of actual device keys for all devices in the subnet network, and each actual device key comprises one or more device identifying attributes of an actual device in the subnet network and an actual device key component to enumerate an actual relative geographic location on the network, compare the actual subnet network geography with the reference subnet network geography and determine whether the actual subnet network geography is compatible with the reference subnet network geography, and commission the subnet network based on the received reference subnet network geography when the received reference subnet network geography is compatible with the actual subnet network geography of the subnet network.

The processing instructions, when executed by the processor, may further cause the processor to: cause an actual subnet network geography to become a new reference subnet network geography for a subnet network.

In yet another aspect, the present invention provides a system that may include a subnet network having devices, and a network apparatus having a processor and non-transitory computer readable medium storing processing instructions for bidirectional network geography delivery.

The processing instructions may include a subnet receiver to receive a reference subnet network geography from a device on a main network, wherein the reference subnet network geography may include a complete set of reference device keys for all devices in the subnet network, and each reference device key comprises one or more device identifying attributes of a reference device in the subnet network and a reference device key component to enumerate a reference relative geographic location on the network, a subnet storage processor to store the received reference subnet geography, a subnet retriever to retrieve an actual subnet network geography of the subnet network where the actual subnet network geography may include a complete set of actual device keys for all devices in the subnet network, and each actual device key comprises one or more device identifying attributes of an actual device in the subnet network and an actual device key component to enumerate an actual relative geographic location on the network, a subnet comparator to compare the actual subnet network geography with the reference subnet network geography and determine if the actual subnet network geography is compatible with the reference subnet network geography, and a subnet commissioner to commission the subnet network based on the received reference subnet network geography when the received reference subnet network geography is compatible with the actual subnet network geography of the subnet network.

The processing instructions may also include a subnet committer to cause the actual subnet network geography to become a new reference subnet network geography for the subnet network.

These and other benefits may become clearer upon making a thorough review and study of the following detailed description. Further, while the embodiments discussed above can be listed as individual embodiments, it is to be understood that the above embodiments, including all elements contained therein, can be combined in whole or in part.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above, except where different specific meanings have otherwise been set forth herein.

DETAILED DESCRIPTION OF THE INVENTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Furthermore, the use of "right", "left", "front", "back", "upper", "lower", "above", "below", "top", or "bottom" and variations thereof herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1A:
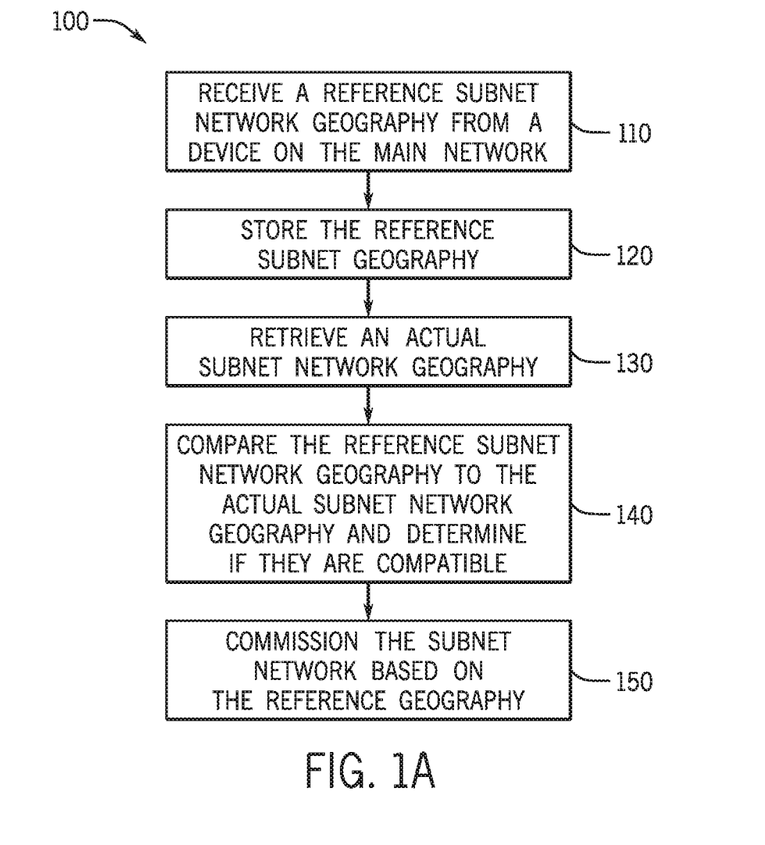
FIG. 1A is a flowchart that illustrates a method of network geography delivery where a reference network geography is delivered from a device residing on a main network to a subnet bridge or router so that it can be applied to a subnet.

FIG. 1A is a flowchart that illustrates a method 100 of network geography delivery where a reference network geography is delivered from a device residing on a main network to a subnet gateway or router so that it can be applied to a subnet. As shown in FIG. 1A, the method 100 includes receiving a reference subnet network geography from a device on the main network 110, storing the reference subnet network geography 120, retrieving an actual reference subnet network geography 130, comparing the reference subnet network geography to the actual subnet network geography and determining if they are compatible 140 and commissioning the subnet network based on the reference network geography 150. Commissioning can require input from a user or can be an automated or automatic process.

A network may have multiple devices that are connected with each other. For example, a network may have industrial control devices such as relays, motor starters and pushbuttons. A network may also have data processing devices such computers. A network may have both industrial control devices and data processing devices that are connected with each other. Further, a network may act as a subnet, where subnet network devices can be accessed by devices on a main network through a gateway and/or router.

Each device in the subnet network may have a device key that may include key components for one or more device identifying attributes associated with the device and a key component to enumerate a relative geographic location on the network. Thus the device key may be used for identifying the device on the nodal geographic subnet network. The device key may also be used for determining whether a new device is compatible for the subnet network when a device of the subnet network is replaced. Identifying device key components may include a device vendor, a device type, a device product code, a device series, a device serial number, or any combination thereof, and may include a key component to enumerate a relative geographic location in a network. The device product code may be a catalog number, and the device series may also be a device revision as non-limiting examples. The device key may have other information that may help to identify the device in the subnet network. For example, for a linear subnet network, the device key may also include the distances between the device and adjacent devices. A network geography may be a complete set of device keys with a relative geographic location key component for all devices on a network. The relative geographic location on the network key component may simply be a geographic position in the network. For a linear subnet network, a geographic position of the device can be a linear geographic position of the device on the subnet network.

A reference subnet network geography includes a complete set of device keys for the devices in the subnet network. A reference subnet network geography may be received by a subnet gateway from a remote source on the main network (110). For example, the network gateway may receive the reference subnet network geography from a commissioning tool that is external to the subnet network.

A commissioning tool may allow a user to customize a subnet network. A user or a client may have a preference for designing a subnet network. As such, the commissioning tool may provide a user interface to allow the user to add, delete, move or replace devices when designing a subnet network. A user may select a particular type of device in a particular position for a subnet network. For example, a user may pick and choose a desktop computer from a particular manufacturer for a particular position. The user may select a computer to be placed in the third position on a linear subnet network. After the user completes the subnet network design, a complete set of network keys for devices on the subnet network may be available. Such a network key set may be sorted based on a relative geographic location key component. The complete network key set constitutes the reference subnet network geography. If the subnet network is built according to the customized design, the reference network would match the actual network geography.

Sometimes, because the commissioning tool is external to the subnet network, the gateway may receive the reference subnet network geography from the commissioning tool through a switch. The switch may be a network device that connects devices together on the network. The gateway may also directly receive the reference network geography from the commissioning tool. In that way, the switch may not be needed for the gateway to receive the reference network geography.

The gateway may actively request the reference network geography information from the commissioning tool. The gateway may also passively receive the reference network geography information from the commissioning tool.

The reference subnet network geography may be stored remotely or locally, or both (120). The network gateway may include a non-transitory computer readable medium for storing the reference subnet network geography. The non-transitory computer readable medium may be inside the network gateway. The received reference subnet network geography may also be stored in a standalone database that may be accessed by the network gateway. The network gateway may receive a reference subnet network geography having the complete set of reference device keys for devices in the subnet network and store them as the reference subnet network geography in a memory of the network gateway or in the memory to the standalone database that is external to the network gateway but may be accessed by the network gateway. The stored reference subnet network geography may be sorted to reflect the order of the devices on the subnet since the device keys contain a key component that enumerates the relative geographic location of the device on the subnet.

To retrieve an actual subnet network geography (130), a network communication may be established to enable a gateway or a router to collect device key information and network geography information from devices in the subnet network. For example, when devices on a subnet network are connected by using a ribbon cable, the gateway for the subnet network may retrieve the device attributes from devices on the subnet network in the sequential order that they are connected to the ribbon cable through the use of a discovery line of the ribbon cable which enables the production of a device identifying message by a first device, and then enables the production of a device identifying message by a second device, etc. These messages can be consumed by the gateway in sequence to assemble the device keys that form the actual nodal geography device key set.

The subnet network may have different topologies. The subnet network may be a linear subnet network, or the subnet network may be network linking devices through a ring or tree structure as non-limiting examples. For a linear subnet network, the multiple network devices are arranged sequentially in the linear subnet network. For linear subnet networks, the device key component that enumerates a relative geographic location on the network can take the form of a simple sequence number. The device key component that enumerates a relative geographic location on the network may be different for different network topologies. For example, for a three-dimensional network, the network position attribute may need three-dimensional coordinates to identify the geographic position of a device in the subnet network.

The attributes of the device key may be customized. For example, when a user designs a linear subnet network, he or she may choose to set the distances between devices. As such, the distances may be included as a component attribute of the device keys for the subnet. However, when a user does not set the distances between devices for a linear subnet network, the distances may not be included in the device keys for the subnet network.

The actual subnet network geography may be changed from time to time. For example, when a new device is added to the subnet network, the network geography for the subnet network can be changed. As such, the retrieved actual subnet network geography may be updated accordingly. The device key retrieval may be conducted at a pre-determined frequency, every day for example. Alternatively, the gateway may only retrieve the device keys for the devices on the subnet network when a change is discovered. Actual geographies may be retrieved and reside in memory, such as RAM, as a non-limiting example.

A comparison between the reference network geography and the actual network geography may be performed (140). Comparing network geographies is done by comparing the network geography device key sets. The purpose of the comparison may be to determine if the reference network geography and the actual network geography are matched. The match may be determined when all device key components contained in the device key set for the reference network geography and all the device key components contained in the device key set for the actual network geography are identical.

However, sometimes, a threshold may be set and the match is determined even though not all device key components in the reference network geography and the actual network geography are exactly the same. For example, in a linear network, when the distance between a device and adjacent two devices is one of the key elements, and when the reference key has a value of three feet, a match may still be determined when the actual key has a value that is between 2.5 to 3.5 feet. In this case, a threshold of six inches may be set for this key component. As such, a threshold may serve as a tolerance for the comparison.

The tolerance may be pre-determined. The tolerance is for the gateway to determine whether a match exists or whether the actual network geography is compatible with the reference network geography even though they are not exactly the same. For example, as mentioned above, the distances between a device and adjacent devices may be part of the design and may be added as a component of the device key for the device. A user may use the commissioning tool to design the subnet network and set the distances to be three (3) feet for separating a device from its adjacent devices. However, when the subnet network is built, the actual distances may be 3.1 feet and 2.9 feet. Thus, without a tolerance, the two sets of network geography may not be matched or they are not compatible. However, when a tolerance is set with a value of 0.5 feet for example, the gateway may determine that the actual network geography matches the reference network geography, or the actual network geography is compatible with the reference network geography.

The tolerance may be defined and set for each attribute of the device key. For example, as mentioned above, a tolerance of 0.5 feet, for example, may be set for the distance attribute. The user may also choose not to set or define the tolerance for certain attributes in the device key. For example, the user may not define the tolerance for the network position attribute for a linear subnet network. In which case, a match may only be determined when a device in the linear subnet network has the exactly same network position attribute in the device key of the actual network geography as the network position attribute in the device key of the reference network geography for the same device.

Sometimes the compatibility of non-identical device key components for a system may be determined by other means besides using a tolerance as described above. For example, a user may want to allow compatibility for devices with different firmware revisions. The user may want a replacement device with all other key components matching device keys to be considered a compatible device when the firmware revision of the replacement devices is greater than or equal to the firmware revision in the original device.

The comparison may be done by using the subnet network gateway. The gateway may read the reference network geography stored locally from the non-transitory computer readable medium on the gateway. The gateway may also read the reference network geography from a standalone database that is external to the gateway. A new reference network geography may also be received from a configuration tool by the gateway. The gateway may compare the reference network geography with a retrieved actual network geography. The gateway may sort both the actual network geography and the reference network geography in the same way before the comparison is conducted. Even though the stored actual network geography and the received reference network geography may be sorted before, the gateway may re-sort them before the comparison because the sorts conducted before on two sets of network geography may not match to each other.

Because the actual subnet geography may be discovered and may be compared with a received reference subnet geography, the subnet may be commissioned (150). Commissioning a device is the process of setting the device address for the device, where the device address is used by the communication protocol to access the device. Commissioning an actual network is the process of setting the device addresses for all devices on the network. After the actual subnet geography is discovered and after the reference subnet geography is received, the network gateway may determine whether the actual subnet geography and the reference subnet geography are matched or compatible. If they are matched or compatible, the device addresses associated with the devices in the reference network geography can be set in the corresponding devices in the actual network, thus automatically commissioning the subnet.

Figure 1B:
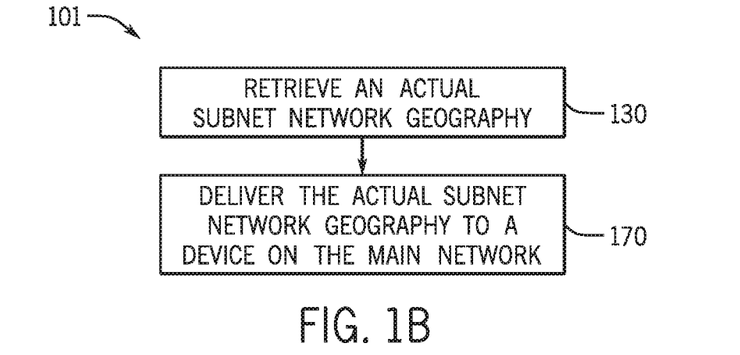
FIG. 1B is a flowchart that illustrates the method for an actual subnet network geography to be retrieved by a subnet gateway or router and delivered to a device residing on a main network.

FIG. 1B is a flowchart that illustrates the method for an actual subnet network geography to be retrieved by a subnet gateway or router and delivered to a device residing on a main network, usually a system commissioning tool. To retrieve an actual subnet network geography (130), a network communication may be established to enable a gateway or a router to collect device key information from devices in the subnet network. For example, when devices on a subnet network are connected by using a ribbon cable, the gateway for the subnet network may retrieve the device attributes from devices on the subnet network in the sequential order that they are connected to the ribbon cable through the use of a discovery line of the ribbon cable, which enables the production of a device identifying message by a first device, and then enables the production of a device identifying message by a second device, etc. These messages can be consumed by the gateway in sequence to assemble the device keys that form the actual nodal geography device key set.

The subnet network may have different topologies. The subnet network may be a linear subnet network, or the subnet network may be network linking devices through a ring or tree structure as non-limiting examples. For a linear subnet network, the multiple network devices are arranged sequentially in the linear subnet network. For linear subnet networks, the device key component that enumerates a relative geographic location on the network can take the form of a simple sequence number, which is added to the consumed device key information as device identifying messages are consumed in sequence.

The device key component that enumerates a relative geographic location on the network may be different for different network topologies. For example, for a three-dimensional network, the network position attribute may need three-dimensional coordinates to identify the geographic position of a device in the subnet network.

To deliver the actual subnet network geography to a device on the main network 170 such as a commissioning tool, the gateway can deliver the device key set for the actual network. In this way a commissioning tool can display the actual network geography to the user for inspection. This is useful if it has been determined that a reference subnet network geography that was defined in the commissioning tool is not compatible with an actual subnet network geography. The user can identify the devices in the two network geographies that do not match, and choose to either modify the reference subnet network geography to match the actual subnet network geography, or modify the actual subnet to match the reference subnet network geography.

Figure 1C:
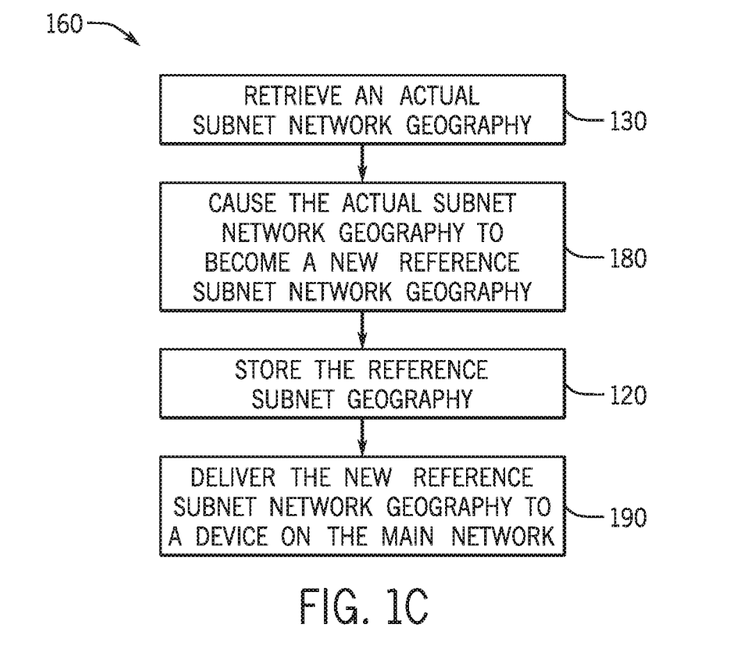
FIG. 1C is a flowchart that illustrates the method to cause the actual subnet network geography to become a new reference subnet network geography.

FIG. 1C is a flowchart that illustrates the method to cause the actual subnet network geography to become a new reference subnet network geography. As shown in FIG. 1C, the method 160 may further include retrieving an actual subnet network geography 130, causing the actual subnet network geography to become a new reference subnet network geography 180. The method 100 may repeat the step 120 to store the reference subnet network geography remotely or locally. The method may include delivering the new reference geography to a device on the main network 190.

Initiation of this method may be done automatically or manually. An actual network may be built, wired and commissioned manually, and when the network system has been tested and the system is verified to work properly, the user can decide manually to initiate this method to turn the actual subnet network geography into a new reference subnet network geography. The user can also choose to have the new reference network geography delivered to a commissioning tool or database on the main network for archiving.

For systems that require automatic backup capabilities, a batch process may create the new reference subnet network geography. The batch process may be scheduled to run periodically. In the scheduled run, the gateway may retrieve the actual subnet network geography by retrieving device keys from each device in the subnet network. Then, the gateway may store the actual subnet network geography to a data storage and may mark the stored subnet network geography as the reference subnet network geography.

The stored new reference subnet network geography may be used for the comparison between the actual subnet network geography and the reference subnet network geography. The stored new reference subnet network geography may be used as the same way as the reference subnet network geography received from the commissioning tool in the comparison. Also, multiple versions of the new reference subnet network geography may be retrieved and stored from different time periods. Each version may have a timestamp to indicate when the new reference subnet network geography is retrieved and stored. As such, when there is a mismatch between the actual subnet network geography and the reference subnet network geography, it is possible to know when the reference subnet network geography is created. Furthermore, when multiple versions with timestamps are available, it is possible to compare with the actual subnet network geography with multiple versions of the reference subnet network geography to determine when the mismatch may start occurring. The multiple versions of the reference subnet network geography thus assist the trouble shooting of the network problems by identifying when the problem may occur.

Figure 2A:
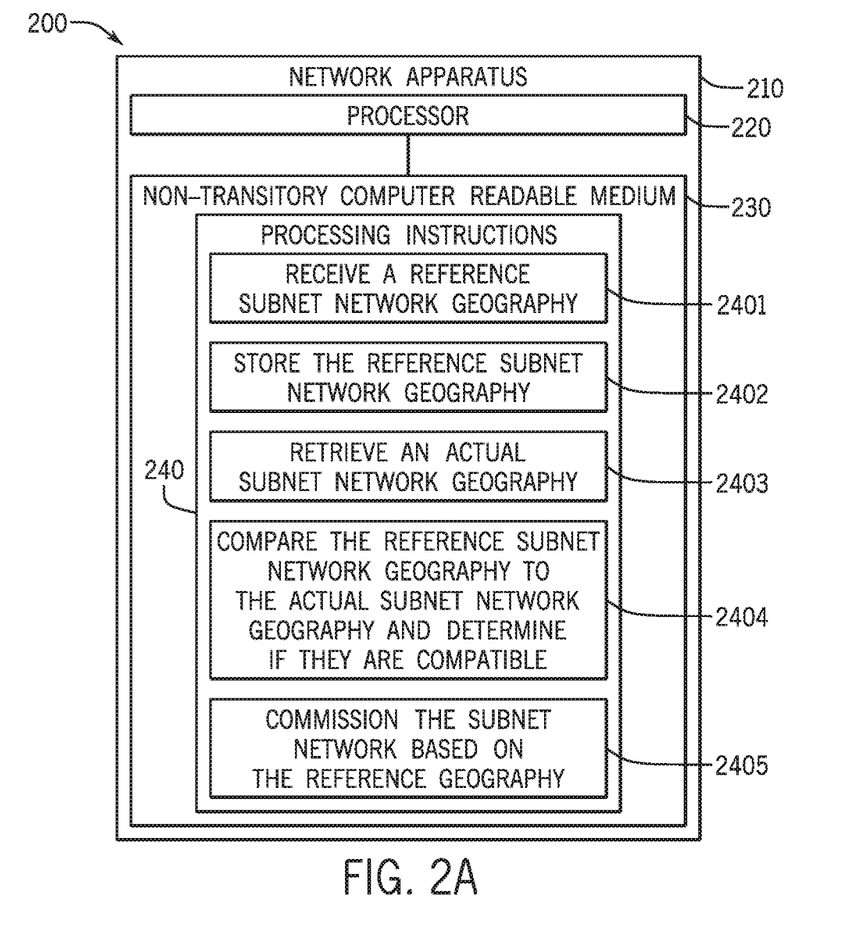
FIG. 2A illustrates a network apparatus for network geography delivery where a reference network geography is delivered from a device residing on a main network to a subnet gateway or router so that it can be applied to a subnet.

FIG. 2A illustrates a network apparatus 210 to accommodate network geography delivery where a reference network geography is delivered from a device residing on a main network to a subnet gateway or router so that it can be applied to a subnet. As shown in FIG. 2A, the network apparatus 210 may include a processor 220 and non-transitory computer readable medium 230 storing processing instructions 240 for accommodating network geography delivery.

The processing instructions 240, when executed by the processor 220, may cause the processor 220 to receive, by the network apparatus, a reference subnet network geography 2401 from a device such as a commissioning tool on a main network, where the reference subset network geography may include a complete set of reference device keys for all devices for the subnet network, and each reference device key may include one or more device identifying attributes for a reference device in the subnet network and include a relative geographic location key component.

The processing instructions 240, when executed by the processor 220, may also cause the processor 220 to store the reference subset geography 2402 remotely or locally in the non-transitory computer readable medium of the network apparatus.

The processing instructions 240, when executed by the processor 220, may also cause the processor 220 to retrieve an actual subnet network geography 2403 of a subnet network, where the actual subnet network geography may include a complete set of actual device keys for all devices in the subnet network, and each actual device key may include one or more device identifying attributes of an actual device in the subnet network and include a relative geographic location key component.

The processing instructions 240, when executed by the processor 220, may also cause the processor 220 to compare the actual subnet network geography with the reference subnet network geography and determine whether the actual subnet network geography is compatible with the reference subnet network geography 2404.

The processing instructions 240, when executed by the processor 220, may cause the processor 220 to commission the subnet network 2405 based on the received reference subnet network geography when the received reference subnet network geography is compatible with the actual subnet network geography of the subnet network.

Figure 2B:
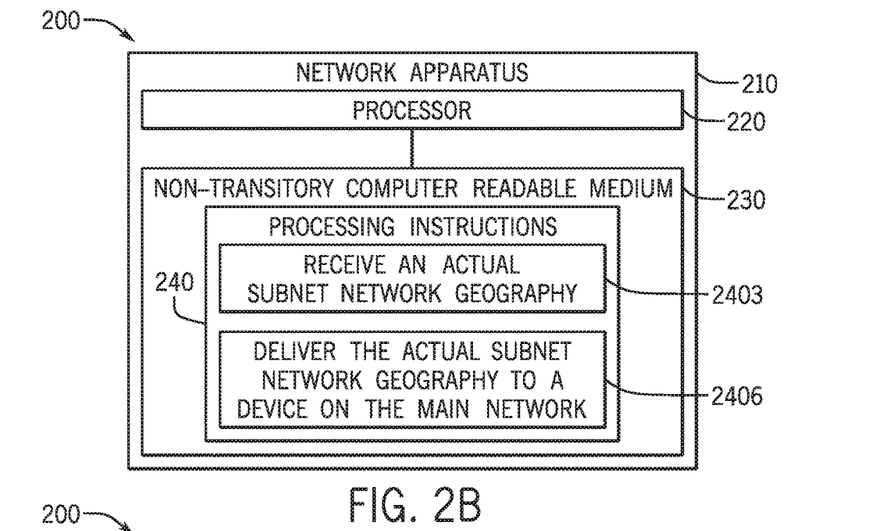
FIG. 2B illustrates a network apparatus for an actual subnet network geography to be retrieved by a subnet gateway or router and delivered to a device residing on a main network.

FIG. 2B illustrates a network apparatus for an actual subnet network geography to be retrieved by a subnet gateway or router and delivered to a device residing on a main network. As shown in FIG. 2B, the network apparatus 210 may include a processor 220 and non-transitory computer readable medium 230 storing processing instructions 240 for accommodating network geography delivery.

The processing instructions 240, when executed by the processor 220, may also cause the processor 220 to retrieve an actual subnet network geography 2403 of a subnet network, where the actual subnet network geography may include a complete set of actual device keys for all devices in the subnet network, and each actual device key may include one or more device identifying attributes of an actual device in the subnet network and include a relative geographic location key component. The non-transitory computer readable medium 230 of the network apparatus 210 may have additional processing instructions 240, that when executed, may cause the processor 220 to deliver the retrieved actual subnet network geography of the subnet network to a device such as a commissioning tool on the main network 2406.

Figure 2C:
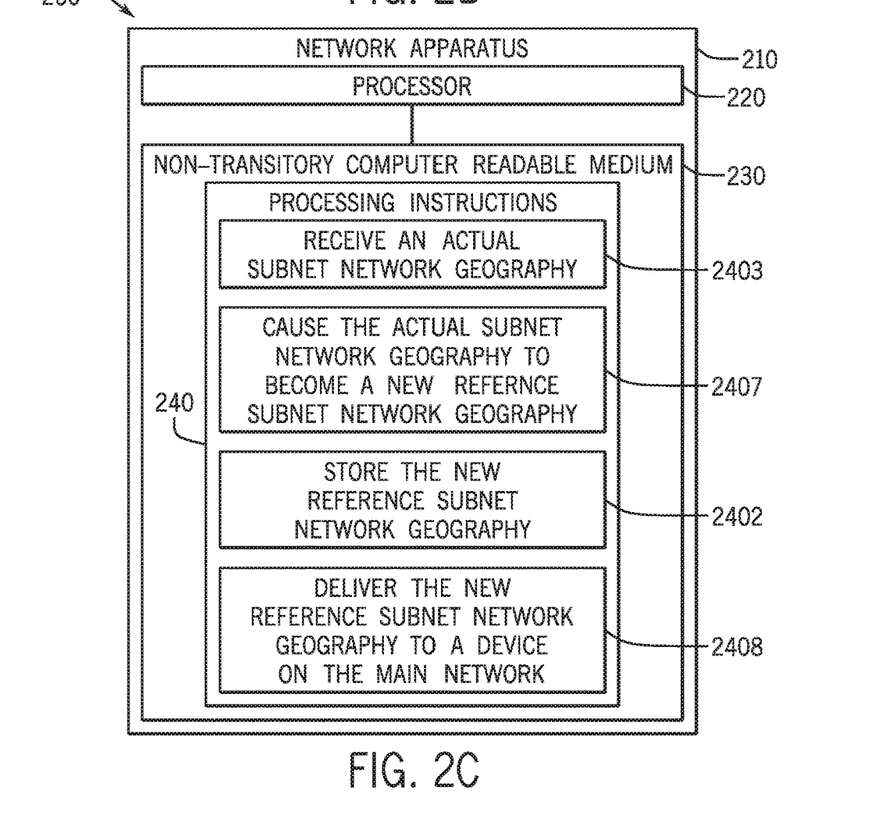
FIG. 2C illustrates a network apparatus for creating a new reference subnet network geography by using the actual subnet network geography.

FIG. 2C illustrates a network apparatus for creating a new reference subnet network geography by using the actual subnet network geography. As shown in FIG. 2C, the network apparatus 210 may include a processor 220 and non-transitory computer readable medium 230 storing processing instructions 240. The processing instructions 240, when executed by the processor 220, may cause the processor 220 to retrieve an actual subnet network geography 2403, cause the actual subnet network geography to become a new reference subnet network geography 2407 and store the reference subnet network geography 2402.

The processing instructions 240, when executed by the processor 220, may cause the processor 220 to deliver the new reference geography to a device on the main network 2408 such as a commissioning tool.

Figure 3:
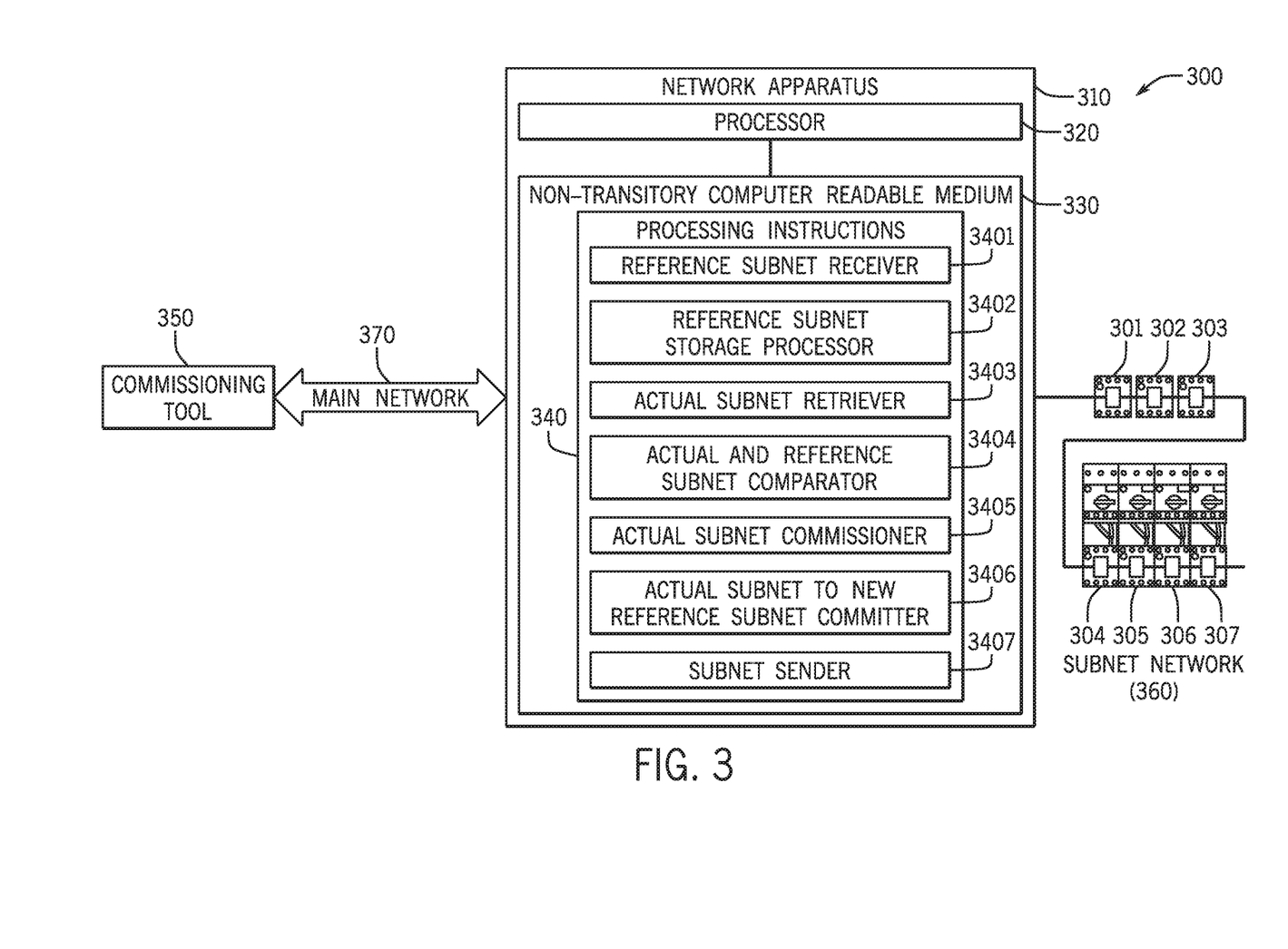
FIG. 3 illustrates a system that delivers network geographies bidirectionally.

FIG. 3 illustrates a system 300 that can deliver network geographies bidirectionally. In one direction, a reference subnet network geography can be delivered from a commissioning tool 350 on a main network 370 to a network apparatus 310 such as a gateway or router and then have the network apparatus 310 commission an actual subnet. In the other direction, an actual subnet network geography can be retrieved by the network apparatus 310 and delivered via the main network 370 to a commissioning tool 350 or other device on the main network 370. As shown in FIG. 3, the system 300 may include a subnet network 360 having multiple network nodes such as relays 301, 302 and 303 and/or starters 304, 305, 306 and 307. The system may also include a network apparatus 310 having a processor 320 and non-transitory computer readable medium 330 storing processing instructions 340 for delivering a network geography. The network apparatus 310 may be connected with the subnet network 360 and a main communication network 370.

The processing instructions 340 may include a subnet receiver 3401 to receive a reference subnet network geography from a device on the main network 370 such as a commissioning tool 350, where the reference subset network geography may include a complete set of device keys for all devices in the subnet network, and each device key comprises one or more device identifying attributes of a device in the subnet network and a relative geographic location key component.

The processing instructions 340 may also include a reference subnet storage processor 3402 to store the received reference subset geography locally in the non-transitory computer readable medium 330 of the network apparatus 310.

The processing instructions 340 may also include an actual subnet retriever 3403 to retrieve an actual subnet network geography of the subnet network 360, where the actual subnet network geography may include a complete set of device keys for all devices in the subnet network 360, and each device key comprises one or more device identifying attributes of a device in the subnet network and a relative geographic location component.

The processing instructions 340 may comprise an actual and reference subnet comparator 3404 to compare the retrieved actual subnet network geography with the reference subnet network geography, and determine if the actual subnet network geography is compatible with the reference subnet network geography.

The processing instructions 340 may also include a subnet commissioner 3405 to commission the subnet network based on the received reference subnet network geography when the received reference subnet network geography is compatible with the actual subnet network geography of the subnet network.

The processing instructions 340 may further comprise an actual subnet to reference subnet committer 3406 that converts an actual retrieved subnet network geography into a new reference subnet network geography. Typically these processing instructions are followed by executing the reference subnet storage processor 3402 to store the new reference subnet geography remotely or locally in the non-transitory computer readable medium 330 of the network apparatus 310.

The processing instructions 340 may comprise a subnet sender 3407 to send a retrieved actual subnet network geography or a newly committed reference subnet geography to a commissioning tool 350 or other device on the main network 370.

Figure 4:
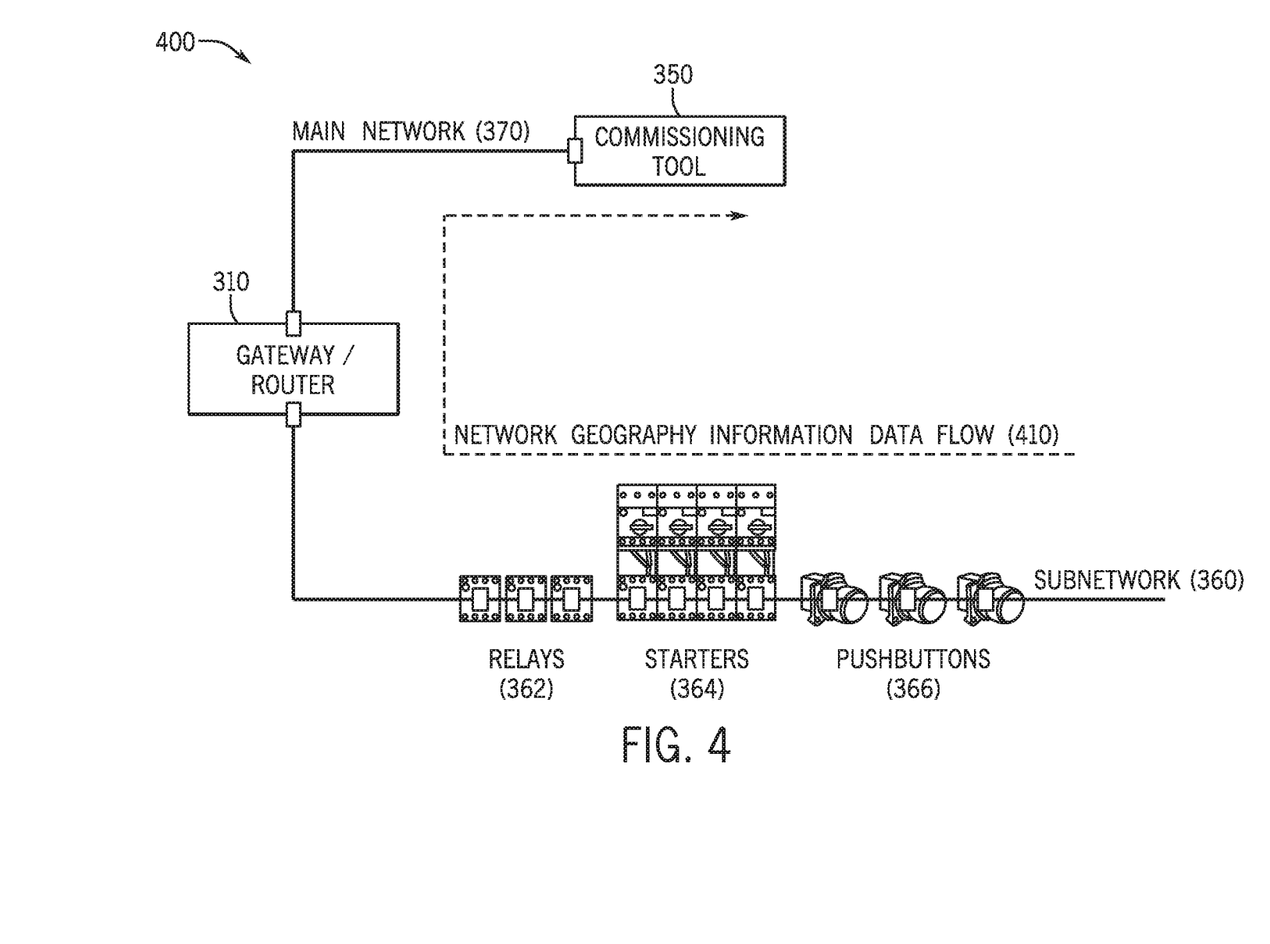
FIG. 4 illustrates the data flow for retrieving an actual subnet network geography and delivering it to a commissioning tool on a main network.

FIG. 4 illustrates the data flow for retrieving an actual linear subnet network geography and delivering it to a commissioning tool on a main network. As shown in FIG. 4, the subnet network 360 is a linear subnet network with multiple network devices such as relays 362, starters 364 and pushbuttons 366. In FIG. 4, the gateway/router 310 manages the liner subnet network and may retrieve network geography information from devices in the linear subnet network. The gateway/router 310 may have the ability to send to the commissioning tool 350 via the main network 370.

Figure 5:
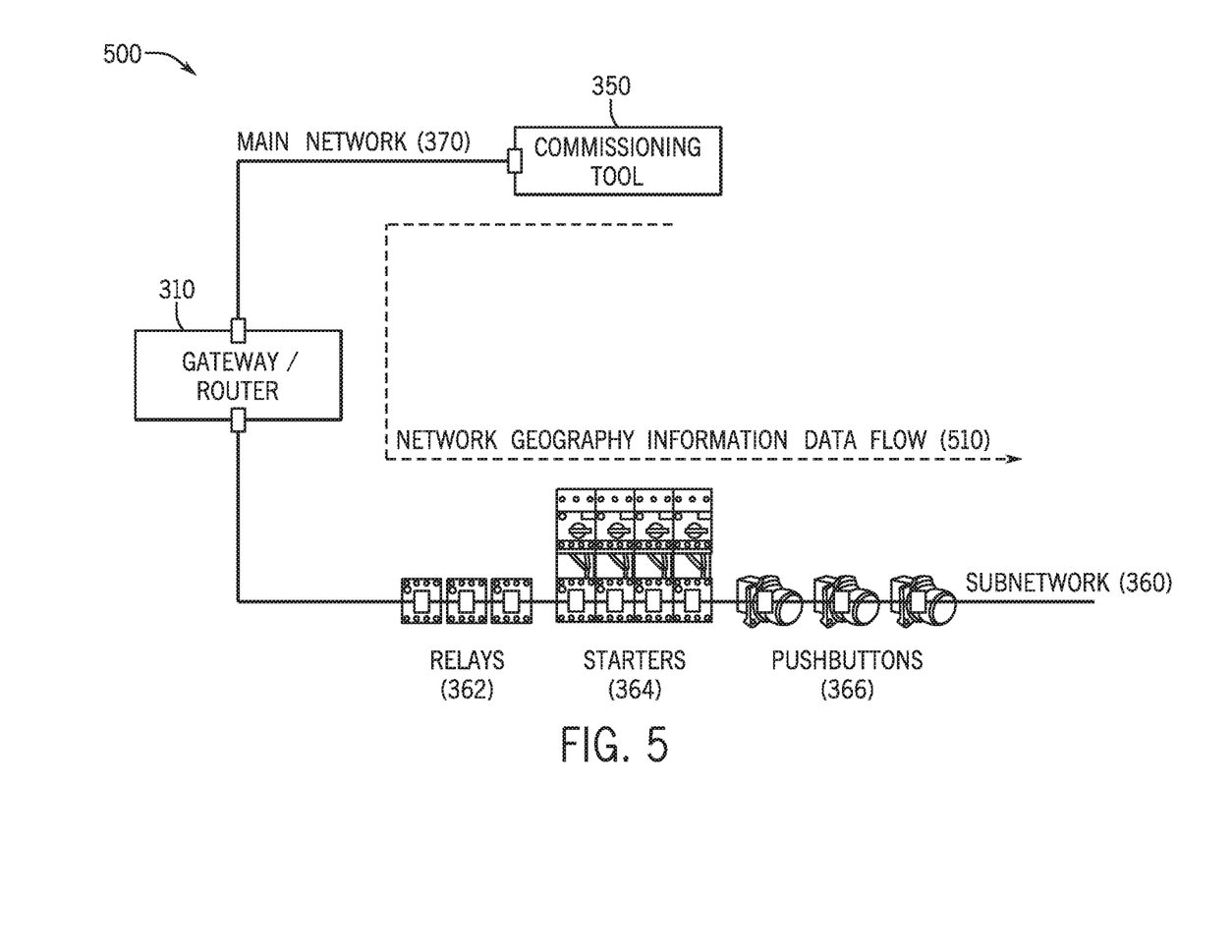
FIG. 5 illustrates the data flow for receiving a reference geography from a commissioning tool on a main network and using it to commission a subnet network.

FIG. 5 illustrates the data flow for receiving a linear reference subnet network geography by a gateway/router 310 from a commissioning tool 350 on a main network 370 and using it to commission a linear subnet network 360 with multiple network devices such as relays 362, starters 364 and pushbuttons 366 based on the received subnet network geography when the gateway/router 310 determines that the actual nodal subnet geography and the reference geography are compatible.

Figure 6:
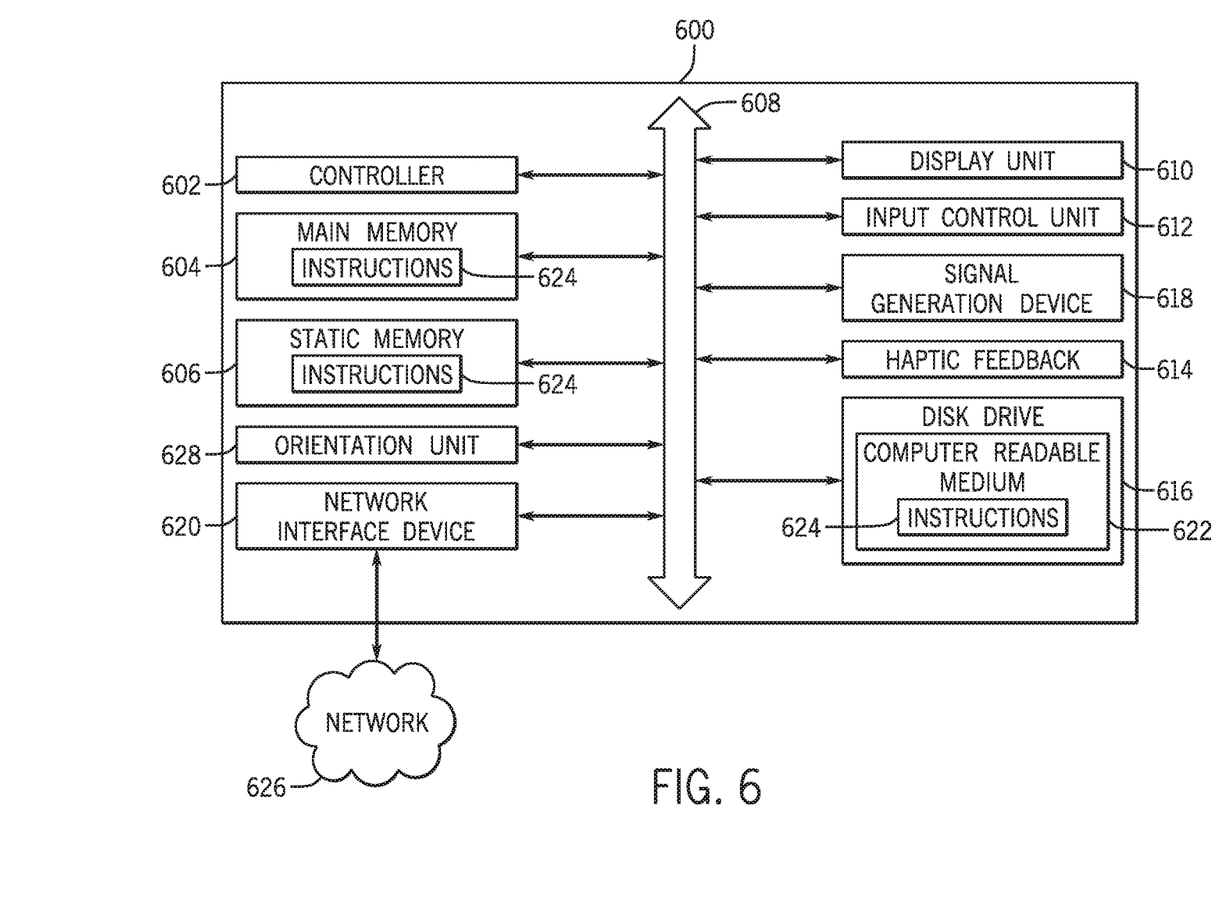
FIG. 6 illustrates an example of a computer system that may be used for bidirectional network geography delivery.

FIG. 6 illustrates an example of a computer system 600 that may be used to facilitate network geography delivery bidirectionally. Referring to FIG. 6, an illustrative embodiment of a computer system 600 may be used for one or more of the components illustrated by the methods and systems in FIGS. 1-3, or in any other systems configured to carry out the methods discussed in this disclosure. Although the computer system 600 is illustrated in FIG. 6 as including all of the components as illustrated, it is within the scope of this innovation for the computing system to be comprised of fewer, or more, components than just illustrated in FIG. 6.

The computer system 600 can include a set of instructions 624 that can be executed to cause the computer system 600 to perform any one or more of the methods, processes or computer-based functions disclosed herein. For example, the bidirectional network geography delivery tool as described herein may be a program comprised of a set of instructions 624 that are executed by the controller 602 to perform any one or more of the methods, processes or computer-based functions described herein. Such a program may be stored in whole, or in any combination of parts, on one or more of the exemplary memory components illustrated in FIG. 6, such as the main memory 604, static memory 606, or disk drive 616.

As described, the computer system 600 may be a mobile device. The computer system 600 may also be connected using a network 626, to other computer systems or peripheral devices. In a networked deployment, the computer system 600 may operate in the capacity of a server or as a client user computer in a server-client user network environment, or as a peer computer system in a peer-to-peer (or distributed) network environment.

In addition to embodiments in which the computer system 600 is implemented, the computer system 600 may also be implemented as, or incorporated into, various devices, such as a personal computer ("PC"), a tablet PC, a set-top box ("STB"), a personal digital assistant ("PDA"), a mobile device such as a smart phone or tablet, a palmtop computer, a laptop computer, a desktop computer, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a controller 602, such as a central processing unit ("CPU"), a graphics processing unit ("GPU"), or both. Moreover, the computer system 600 can include a main memory 604, and additionally may include a static memory 606. In embodiments where more than one memory components are included in the computer system 600, the memory components can communicate with each other via a bus 608. As shown, the computer system 600 may further include a display unit 610, such as a liquid crystal display ("LCD"), an organic light emitting diode ("OLED"), a flat panel display, a solid state display, or a cathode ray tube ("CRT"). Additionally, the computer system 600 may include one or more input devices 612, such as a keyboard, push button(s), scroll wheel, digital camera for image capture and/or visual command recognition, touch screen, touchpad or audio input device (e.g., microphone). The computer system 600 can also include signal outputting components such as a haptic feedback component 614 and a signal generation device 618 that may include a speaker or remote control as non-limiting examples.

Although not specifically illustrated, the computer system 600 may additionally include a GPS (Global Positioning System) component for identifying a location of the computer system 600. Additionally, the computer system 600 may include an orientation unit 628 that includes any combination of one or more gyroscope(s) and accelerometer(s).

The computer system 600 may also include a network interface device 620 to allow the computer system 600 to communicate via wireless, or wired, communication channels with other devices. The network interface device 1120 may be an interface for communicating with another computer system via a Wi-Fi connection, Bluetooth connection, Near Frequency Communication connection, telecommunications connection, internet connection, wired Ethernet connection, or the like. The computer system 600 may also optionally include a disk drive unit 616 for accepting a computer readable medium 622. The computer readable medium 622 may include a set of instructions that are executable by the controller 602, and/or the computer readable medium 622 may be utilized by the computer system 600 as additional memory storage.

In a particular embodiment, as depicted in FIG. 6, the disk drive unit 616 may include a computer-readable medium 622 in which one or more sets of instructions 624, such as software, can be embedded. Further, the instructions 624 may embody one or more of the methods, processes, or logic as described herein. In a particular embodiment, the instructions 624 may reside completely, or at least partially, within the main memory 604, the static memory 606, and/or within the controller 602 during execution by the computer system 600. The main memory 604 and the controller 602 also may include computer-readable media.

In an alternative embodiment, dedicated hardware implementations, including application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present computer system 600 may encompass software, firmware, and hardware implementations. The term "module" or "unit" may include memory (shared, dedicated, or group) that stores code executed by the processor.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 622 that includes instructions 624 or receives and executes instructions 624 responsive to a propagated signal, so that a device connected to a network 626 can communicate voice, video or data over the network 626. Further, the instructions 624 may be transmitted or received over the network 626 via the network interface device 620.

While the computer-readable medium 624 is shown to be a single medium, the term "computer-readable medium" includes a single medium or multiple media, such as a centralized or distributed database, and/or associated caches and servers that store one or more sets of instructions. The term "computer-readable medium" shall also include any tangible medium that is capable of storing, encoding or carrying a set of instructions for execution by a processor or that cause a computer system to perform any one or more of the methods or operations disclosed herein.

In a particular non-limiting, exemplary embodiment, the computer-readable medium 622 can include a solid-state memory such as a memory card or other package that houses one or more non-volatile read-only memories, such as flash memory. Further, the computer-readable medium 622 can be a random access memory or other volatile re-writable memory. Additionally, the computer-readable medium 622 can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium 622 or a distribution medium and other equivalents and successor media, in which data or instructions may be stored. The computer readable medium may be either transitory or non-transitory.

Although the present specification describes components and functions that may be implemented in particular embodiments with reference to particular standards and protocols commonly used by network companies and broader resources and utilities institutions, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The present disclosure describes embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the embodiments may be combined in any suitable manner in one or more embodiments. In the description, numerous specific details are recited to provide a thorough understanding of embodiments of the invention. One skilled in the relevant art will recognize, however, that the embodiments may be practiced without one or more of the specific details, or with other methods, components, materials, and so forth. In other instances, well-known structures, materials, or operations are not shown or described in detail to avoid obscuring aspects of the invention.

Although the above discussion discloses various exemplary embodiments of the invention, it should be apparent that those skilled in the art can make various modifications that will achieve some of the advantages of the invention without departing from the true scope of the invention.

We claim:

1. A method of bidirectional network geography delivery, the method comprising:
   receiving, by a network gateway, a reference subnet network geography from a device on a main network, wherein the reference subnet network geography comprises a complete set of reference device keys for all devices in a subnet network, and each reference device key comprises one or more device identifying attributes of a reference device in the subnet network as well as a reference device key component to enumerate a reference relative geographic location on the subnet network;
   storing the received reference subnet network geography;
   retrieving an actual subnet network geography of the subnet network, wherein the actual subnet network geography comprises a complete set of actual device keys for all devices in the subnet network, and each actual device key comprises one or more device identifying attributes of an actual device in the subnet network as well as an actual device key component to enumerate an actual relative geographic location on the subnet network;
   comparing the reference subnet network geography to the actual subnet network geography and determining compatibility; and
   in response to determining compatibility:
      commissioning, via a commissioning tool, the subnet network based on the received reference subnet network geography.

2. The method of claim 1, wherein each device in the subnet network has an associated device key, wherein the device key comprises one or more device identifying attributes as well as a network position attribute for the device in the subnet network.

3. The method of claim 2, wherein the network position attribute identifies a geographic position of the device in the subnet network.

4. The method of claim 1, further comprising accepting the reference subnet network geography from a user by using the commissioning tool, and wherein receiving the reference subnet network geography by the network gateway is from the commissioning tool on the main network.

5. The method of claim 1, further comprising sending the actual subnet network geography of the subnet network to the commissioning tool, wherein the commissioning tool is on the main network, and wherein the main network is external to the subnet network.

6. The method of claim 1, further comprising building the subnet network according to a user design, wherein the user design is used for developing the reference subnet network geography.

7. The method of claim 1, further comprising causing the actual subnet network geography to become a new reference subnet network geography.

8. The method of claim 7, further comprising sending the new reference subnet network geography of the subnet network to the commissioning tool, wherein the commissioning tool is on the main network, and wherein the main network is external to the subnet network.

9. A network apparatus comprising: a processor and non-transitory computer readable medium storing processing instructions for bidirectional network geography delivery, wherein the processing instructions, when executed by the processor, cause the processor to:
   receive, by the network apparatus, a reference subnet network geography from a device on a main network, wherein the reference subnet network geography comprises a complete set of reference device keys for all devices in a subnet network, and each reference device key comprises one or more device identifying attributes for a reference device in the subnet network as well as a reference device key component to enumerate a reference relative geographic location on the subnet network;
   store the reference subnet network geography;

retrieve an actual subnet network geography of the subnet network, wherein the actual subnet network geography comprises a complete set of actual device keys for all devices in the subnet network, and each actual device key comprises one or more device identifying attributes of an actual device in the subnet network as well as an actual device key component to enumerate an actual relative geographic location on the subnet network;

compare the actual subnet network geography with the reference subnet network geography, and determine compatibility; and in response to determining compatibility:
commission, via a commissioning tool, the subnet network based on the received reference subnet network geography.

10. The network apparatus of claim 9, wherein each device in the subnet network has an associated device key, wherein the device key comprises one or more device identifying attributes as well as a network position attribute for the device in the subnet network.

11. The network apparatus of claim 10, wherein the network position attribute identifies a geographic position of the device in the subnet network.

12. The network apparatus of claim 9, wherein the processing instructions further cause the processor to accept the reference subnet network geography from a user by using the commissioning tool, and wherein the reference subnet network geography is received by the network apparatus from the commissioning tool on the main network.

13. The network apparatus of claim 9, wherein the processing instructions further cause the processor to send the actual subnet network geography of the subnet network to the commissioning tool, wherein the commissioning tool is on the main network, and wherein the main network is external to the subnet network.

14. The network apparatus of claim 9, wherein the processing instructions further cause the processor to cause the actual subnet network geography to become a new reference subnet network geography.

15. The network apparatus of claim 14, wherein the processing instructions further cause the processor to send the new reference subnet network geography of the subnet network to a commissioning tool, wherein the commissioning tool is on the main network, and wherein the main network is external to the subnet network.

16. A system comprising:
a subnet network having devices;
a main network having main network devices; and
a network apparatus having a processor and non-transitory computer readable medium storing processing instructions for bidirectional network geography delivery, wherein the processor comprises:

a subnet receiver to receive a reference subnet network geography from a main network device on the main network, wherein the reference subnet network geography comprises a complete set of reference device keys for all devices in the subnet network, and each reference device key comprises one or more device identifying attributes of a reference device in the subnet network as well as a reference device key component to enumerate a reference relative geographic location on the subnet network;

a subnet storage processor to store the received reference subnet geography;

a subnet retriever to retrieve an actual subnet network geography of the subnet network, wherein the actual subnet network geography comprises a complete set of actual device keys for all devices in the subnet network, and each actual device key comprises one or more device identifying attributes of an actual device in the subnet network as well as an actual device key component to enumerate an actual relative geographic location on the subnet network;

a subnet comparator to compare the actual subnet network geography with the reference subnet network geography, and determine compatibility; and a subnet commissioner to commission the subnet network based on the received reference subnet network geography in response to the determination of compatibility.

17. The system of claim 16, wherein each subnet device comprises an associated device key, wherein the device key comprises one or more device identifying attributes as well as a network position attribute for the device in the subnet network, and the network position attribute identifies a linear geographic position of the device in the subnet network.

18. The system of claim 16, wherein the processor further comprises a subnet accepter to accept the reference subnet network geography from a user by using a commissioning tool that is external to the subnet network, and wherein the reference subnet network geography is received by the network apparatus from the commissioning tool.

19. The system of claim 16, wherein the processor further comprises a subnet sender to send the actual subnet network geography of the subnet network and the new reference subnet network geography of the subnet network to a commissioning tool that is external to the subnet network.

20. The system of claim 16, wherein the processor further comprises a subnet committer to cause the actual subnet network geography to become a new reference subnet network geography.

* * * * *